(12) United States Patent
Bilodeau et al.

(10) Patent No.: US 9,582,680 B2
(45) Date of Patent: Feb. 28, 2017

(54) SCRUBBE TO REMOVE PERSONALLY IDENTIFIABLE INFORMATION

(71) Applicant: MICROSOFT TECHNOLOGY LICENSING, LLC, Redmond, WA (US)

(72) Inventors: Michael Bilodeau, Cambridge, MA (US); Gustavo Carmo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/168,532

(22) Filed: Jan. 30, 2014

(65) Prior Publication Data

US 2015/0213288 A1 Jul. 30, 2015

(51) Int. Cl.
G06F 7/04 (2006.01)
*G06F 21/62* (2013.01)
*G06F 21/55* (2013.01)

(52) U.S. Cl.
CPC ........ *G06F 21/6245* (2013.01); *G06F 21/552* (2013.01); *G06F 21/6254* (2013.01)

(58) Field of Classification Search
None
See application file for complete search history.

(56) References Cited

U.S. PATENT DOCUMENTS 7,395,241 B1 * 7/2008 Cook ............... G06Q 20/02
235/379
7,724,918 B2 5/2010 Balakrishnan et al.
(Continued)

FOREIGN PATENT DOCUMENTS

GB 2497397 A 6/2013

OTHER PUBLICATIONS

Sweeney, Latanya, "Replacing Personally-Identifying Information in Medical Records, the Scrub System", In Proceedings of the Journal of the American Medical Informatics Association, Jan. 1, 1996, 5 pages.
(Continued)

*Primary Examiner* — Mohammed Waliullah
(74) *Attorney, Agent, or Firm* — Anand Gupta; Tom Wong; Micky Minhas

(57) ABSTRACT

A personally identifiable information (PII) scrubbing system. The PII scrubbing system surgically scrubs PII form a log based on a scrubber configuration corresponding to the log. The scrubber configuration includes context information about locations and types of PII in the log and rules specifying how to locate and protect the PII. Scrubber configurations are quickly and easily created or modified as scrubbing requirements change or new scenarios are encountered. The flexibility provided by the scrubber configurations allows only the PII to be scrubbed, even from unstructured data, without having to include surrounding data. Many consumers can use the scrubbed data without needed to expose the PII because less non-personal data is obscured. Surgical scrubbing also retains the usefulness of the underlying PII even while protecting the PII. Consumers can correlate the protected PII to locate specific information without having to expose additional PII.

20 Claims, 11 Drawing Sheets

(56) References Cited

U.S. PATENT DOCUMENTS

| | | | |
|---|---|---|---|
| 8,051,060 B1* | 11/2011 | Vo | G06F 17/30908 707/705 |
| 2004/0181670 A1 | 9/2004 | Thune et al. | |
| 2006/0069733 A1 | 3/2006 | Antonoff et al. | |
| 2007/0255704 A1 | 11/2007 | Baek et al. | |
| 2009/0048997 A1* | 2/2009 | Manickam | G06F 21/62 706/47 |
| 2009/0049511 A1* | 2/2009 | Manickam | G06F 21/6254 726/1 |
| 2011/0040983 A1* | 2/2011 | Grzymala-Busse | G06F 21/6245 713/189 |
| 2011/0239113 A1 | 9/2011 | Hung et al. | |
| 2014/0047551 A1* | 2/2014 | Nagasundaram | G06F 21/60 726/26 |
| 2014/0115710 A1* | 4/2014 | Hughes et al. | 726/26 |
| 2014/0115712 A1* | 4/2014 | Powell | H04L 63/20 726/26 |
| 2014/0162685 A1* | 6/2014 | Edge | H04W 4/023 455/456.1 |
| 2014/0165137 A1* | 6/2014 | Balinsky | G06F 21/554 726/1 |

OTHER PUBLICATIONS

Friedlin, et al., "A Software Tool for Removing Patient Identifying Information from Clinical Documents", In Proceedings of the Journal of the American Medical Informatics Association, vol. 15, No. 5, Sep. 2008, 11 pages.

Gardner, et al., "HIDE: Heterogeneous Information DE-identification", In Proceedings of the 12th International Conference on Extending Database Technology: Advances in Database Technology, Mar. 2009, 4 pages.

"International Search Report & Written Opinion Received for PCT Patent Application No. PCT/US2015/012554", Mailed Date: Jun. 2, 2015, 11 Pages.

Douglass, et al., "De-Identification Algorithm for Free-Text Nursing Notes", In Proceeding of Computers in Cardiology, Sep. 25, 2005, pp. 331-334.

"Second Written Opinion Issued in PCT Application No. PCT/US2015/012554", Mailed Date: Dec. 7, 2015, 6 Pages.

"International Preliminary Report on Patentability Issued in PCT Application No. PCT/US2015/012554", Mailed Date: Mar. 7, 2016, 7 Pages.

\* cited by examiner

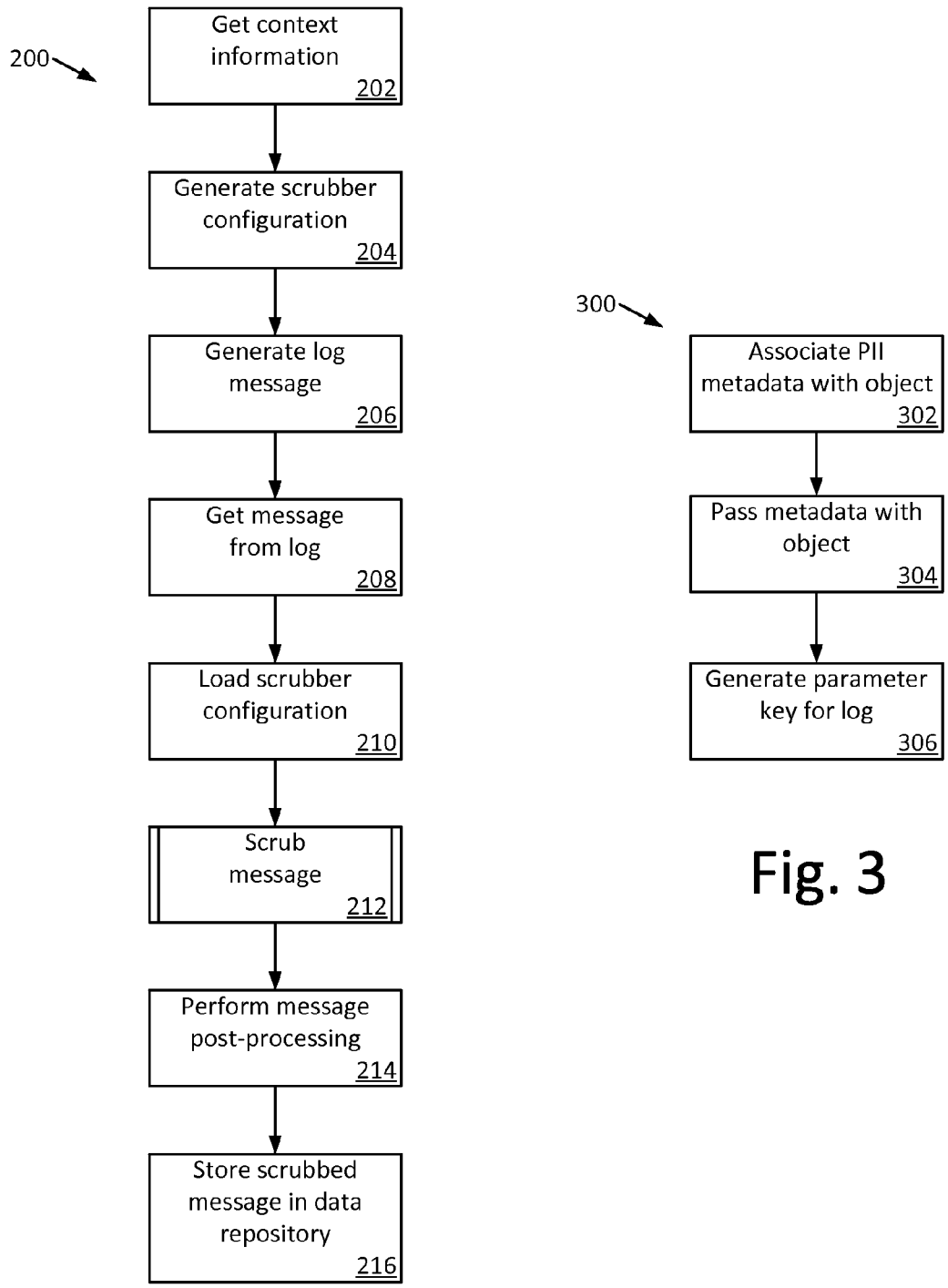

SCRUBBE TO REMOVE PERSONALLY IDENTIFIABLE INFORMATION

BACKGROUND

Many organizations collect system logs, error reports, and other data for routine business purposes. This data can be mined to create and maintain a competitive advantage, but, because such data may contain user information needed for legitimate purposes, the increased availability and access to such data also exposes companies to increased risk of data misuse; intentional or otherwise.

Scrubbing of personally identifiable information (PII) is a standard technique used to remove user information from logs so that the information can be safely accessed by a wider audience, but scrubbing is costly, limited, and imperfect. Although users may be able to identify their personal information when they see it, it is much more difficult to build a scalable and cost effective system that can do the same thing over the petabytes of data that large organizations collect on a daily basis.

Protection of some (PII) may be required by governmental laws or regulations. Even when protection is not required, organizations may be motivated to protect PII for various reasons such as fostering trust with customers/users or minimizing legal risk. Regardless of the reason, protecting PII is expensive in terms of resources (e.g., processing time, storage space, and development time for PII scrubbers), which ultimately translates into a financial cost to the organization. The time required to process logs potentially containing PII may result in organization personnel having delayed access to logs containing the most current information. If a scrubber for the log is not currently available or needs to be modified, organization personnel may not have access to the logs until the situation is remedied. Depending upon priorities and resources, the lag between determining that a log potentially contains PII and developing a proper scrubber may be several months or longer.

In an attempt to minimize the time until the scrubbed logs are available, organizations may resort to over-scrubbing the logs using "brute-force" scrubbers. These brute-force scrubbers often employ imprecise or destructive techniques, such as scrubbing entire portions of the log that potentially contains PII rather than determining whether the data is actually PII, scrubbing that results in the permanent loss of at least some of original data, and/or replacing distinct data items with a token that covers the entire group.

Over-scrubbing often increases processing time and storage requirements because protection is applied indiscriminately even if the target data is not PII. The reason for the increased storage requirements is that many of the protection techniques produce values that are significantly larger than the data being protected. Indiscriminately protecting portions of the log may easily double or triple the original log size. Another cost of over-scrubbing is the loss of valuable business intelligence originally contained in the logs either because data has been destroyed or has been transformed in a manner that limits the ability to analyze it. For example, over-scrubbing uses a single replacement for an entire component of a message (or even the entire message) instead of replacing the individual pieces that make up the larger component making it difficult, if not impossible, to make any meaningful use of the protected data.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of a PII scrubbing system surgically scrub PII from a log based on a scrubber configuration corresponding to the log. The scrubber configuration includes context information about locations and types of PII in the log and rules specifying how to locate and protect the PII. Scrubber configurations are quickly and easily created or modified as scrubbing requirements change or new scenarios are encountered. The flexibility provided by the scrubber configurations allows only the PII to be scrubbed, even from unstructured data, without having to include surrounding data. Many consumers can use the scrubbed data without being exposed to the PII because less non-personal data is obscured. Surgical scrubbing also retains the usefulness of the underlying PII even while protecting the PII. Consumers can correlate the protected PII to locate specific information without having to expose PII. Consumers can also search for data related to the protected PII without having to expose additional PII.

The scrubber configuration provides the information used by the scrubbing agent to locate and scrub PII from messages. In various embodiments, the scrubber configuration provides context information about the data in the messages and the logic for processing the messages based on the context information. The context information indicates where PII is located in log messages or the type of PII. The logic provides instruction on how PII is handled, such as conditions for processing the PII and/or how to protect the PII (e.g., specifying replacement techniques). Collectively, the context information and logic form scrubbing rules. In various embodiments, the scrubbing rules include parsers, processors, and filters, which correspond to the generic actions provided by the scrubbing agent. In some embodiments, the scrubbing rules incorporate the corresponding context information as parameters of the rules. Scrubbing rules may be organized into processing groups. Processing groups allow the operation of one or more rules within the group to be conditioned on the outcome of one or more other rules within the group.

In various embodiments, the scrubbing agent includes a parsing engine that breaks up data into fields or locate data within fields, a processing engine responsible for tasks such as, but not limited to, scrubbing fields containing PII or further parsing the fields into smaller components (e.g., subfields or name/value pairs), and a filtering engine that determines whether a message or field is processed or excluded from processing.

The message scrubbing operation locates and replaces PII in the message using the rules and context information provided by the scrubber configuration. An optional a pre-parsing filtering operation determines if the message should be processed based on whether the content in the message matches filter parameters specified in the scrubber configuration. A message parsing operation parses the message into fields based on parser parameters specified in the scrubber configuration. A processing operation protects the PII based on processor parameters specified in the scrubber configuration. A field selection operation selects the field to scrub.

The processing operation may involve one or more sub-operations that impose scrubbing conditions or refine how the selected field is processed. The sub-operations may include a field parsing operation or a search operation used to locate PII within the selected field. The field parsing operation parses a field into sub-fields or name/value pairs. The search operation that looks for content in the selected field that matches filter parameters (e.g., a pattern) specified in the scrubber configuration. The sub-operations may also include a filtering operation that determines if the selected field should be processed based on whether the contents of a field in the message matches filter parameters specified in the scrubber configuration. Subject to satisfying any conditions imposed by a sub-operation, a replacement value generation operation generates a replacement value for the PII in the selected field. The choice of replacement technique is often a balancing act between minimizing data loss, reducing the impact on performance, and managing data bloat. Examples of the available replacement techniques include, but are not limited to, redaction, static substitution, generalization, hashing, and encryption.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 2 is a high level flowchart of one embodiment of a surgical scrubbing method for protecting PII using the PII scrubbing system;

FIG. 3 is a high level flowchart of one embodiment of the collect context information operation of the surgical scrubbing method for collect context information about PII in a scrubber-friendly development environment;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a personally identifiable information (PII) scrubbing system are described herein and illustrated in the accompanying figures. The PII scrubbing system surgically scrubs PII from a log based on a scrubber configuration corresponding to the log. The scrubber configuration includes context information about locations and types of PII in the log and rules specifying how to locate and protect the PII. Scrubber configurations are quickly and easily created or modified as scrubbing requirements change or new scenarios are encountered. The flexibility provided by the scrubber configurations allows only the PII to be scrubbed, even from unstructured data, without having to include surrounding data. Many consumers can use the scrubbed data without exposure to the PII while still having access to the non-personal data. Surgical scrubbing also retains the usefulness of the underlying PII even while protecting the PII. Consumers can correlate the protected PII to locate specific information without having to expose additional PII.

Figure 1:
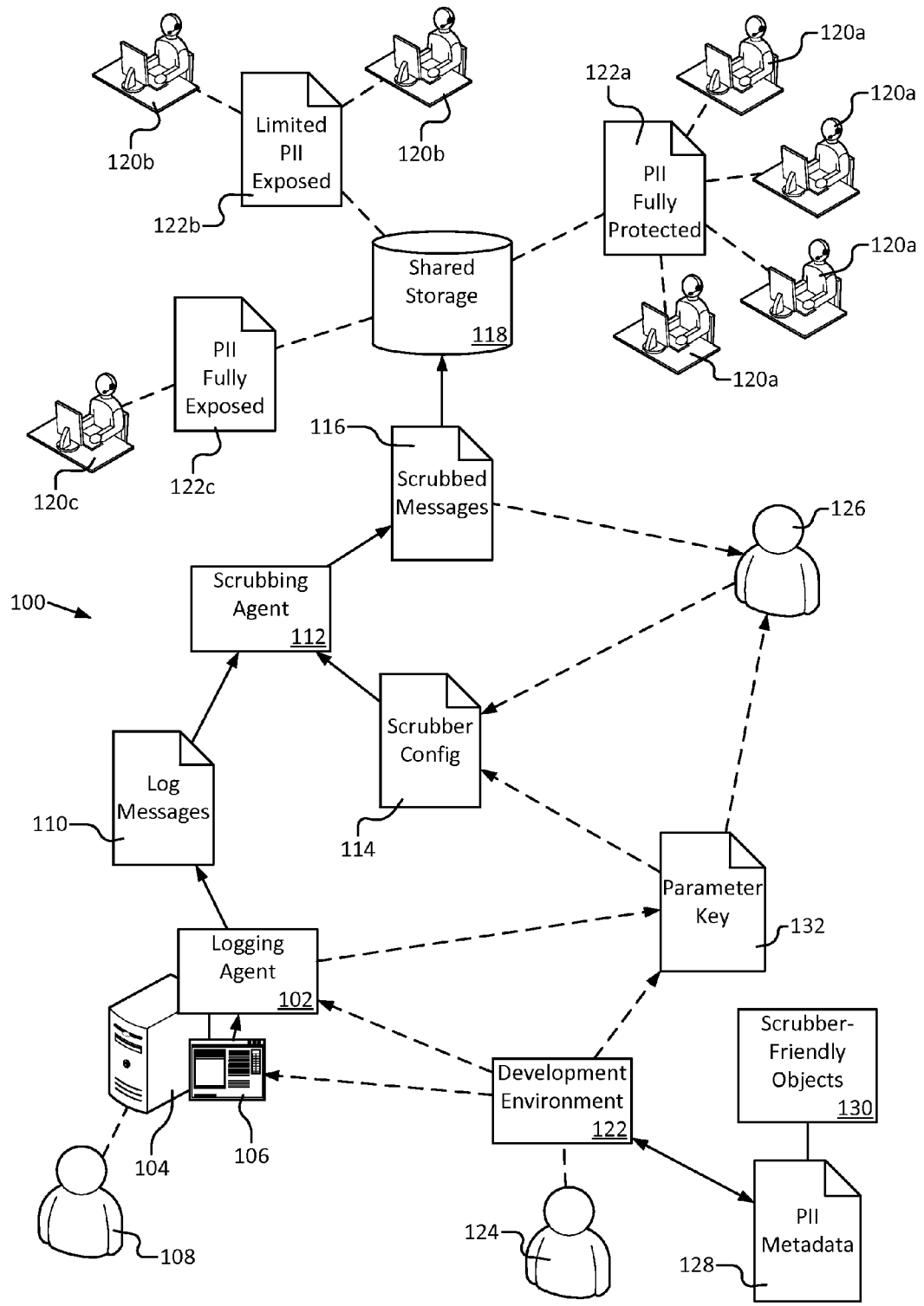
FIG. 1 is a flow diagram of one embodiment of a personally identifiable information (PII) scrubbing system implemented in a suitable computing environment.

FIG. 1 illustrates one embodiment of a PII scrubbing system 100 implemented in a suitable computing environment. As used herein, PII broadly includes anything that users do not want others know. This usually means any data collected about the users or provided by them unless they have explicitly authorized the organization to share that information. Some common examples of PII, such as name, birthdate, SSN, account name, and phone number, are easy to recognize. Other data that may be considered PII includes IP address, company name, and location information. Another potential source of PII is free form data, like document names and e-mail headers.

Scrubbing is used in reference to protecting PII appearing in collections of data. The individual entries in the data collection may be referred to as lines, rows, messages, or records. As an example of specific utility, the PII scrubber system is described in the context of scrubbing PII from logs; however, the PII scrubber system has broader utility and is not intended to be limited to operating on logs. Logs represent collections of a vast amount of data generated on an on-going basis with little to no standardization. As such, logs represent one of the biggest challenges in protecting PII.

The PII scrubbing system 100 includes a logging agent 102 executed on a logged system 104. The logged system is a computing device. Examples of suitable computing devices for implementing the logged system and/or other systems that make up the PII scrubbing system, but are not limited to, server computers, desktop computers, laptops, tablet or surface computers, smart phones, and smart appliances. The logging agent generates logs for a logged application 106. The logged application may be any server or desktop application, including operating systems, as well as any component or service thereof. The logging agent may be independent from the logged application, such as a library or engine that is accessed through an application programming interface (API) and may be used with multiple different logged applications. The logging agent may also integral with and specific to the logged application, such as a module in the application.

The logging agent generates messages 108 that may contain PII collected from users 110 as part of the data routinely logged for business purposes, such as, but not limited to, security auditing, product support, product improvement, product registration, and user registration. Examples of the types of data that may be logged include, but are not limited to, security events (e.g., login attempts and authorizations), input/output events (e.g., network or file system transactions), program errors and crashes, system performance and resource utilization, and program or feature usage. The messages may be streamed, written, or otherwise transmitted to local or remote destinations (i.e., a data stream). The destination may be a volatile storage location, such as an in-memory data object (e.g., an event record), or a non-volatile storage location, such as a file on a secondary storage device (i.e., a hard drive). The messages may be textual data (i.e., string), binary data, or a combination thereof.

The content, naming, organization, structure, and/or presentation of the data may vary between different logs or log types and, sometimes, between messages within a log. For example, logs of the same type may differ depending upon the logging agent or the logged application used. Even logs produced by the same logging agent and logged application may change when updated to a new version of the logging agent or the logged application. It is not uncommon for different business units or locations of a large organization to run alternative applications from different developers or different versions of the same application due to different needs or upgrade cycles.

A scrubbing agent 112 processes the log messages based on a scrubber configuration 114. The scrubbing agent may be a stand-alone application or an integral component of another application, including, but not limited to, the logged application. Although illustrated and described as being executed on a single computing device, the logging agent and the scrubbing agent may be executed on separate computing devices. The PII scrubbing system may operate locally or in a distributed environment, such as in client-server or cloud services architectures. Any distributed components of the PII scrubbing system or resources available to the PII scrubbing system may communicate with each other or be accessed over at least one computer network, such as, but not limited to, the Internet, an intranet, a local area network, or a wide area network. For example, the logging agent may upload an unscrubbed log to a protected central system. Access to the unscrubbed log in the protected central system would be limited to a small group of vetted individuals who need immediate access to log information (i.e. worth the risk of exposure to PII). Subsequently, the unscrubbed log is scrubbed by the scrubbing agent running on the logged system or on the protected central system, and the scrubbed log is uploaded to another system with less restricted access. The majority of consumers would pull the scrubbed data from this last system.

The scrubbing agent includes different engines that perform different types of actions on log messages. In various embodiments, the scrubbing agent includes a parsing engine, a filtering engine, and a processing engine. The parsing engine performs parsing actions that break up data into fields or locate data within fields. The processing engine performs processing actions responsible for tasks such as, but not limited to, scrubbing fields containing PII or forwarding the identified field to a child parser which can break the field into smaller components (e.g., subfields or name/value pairs). The filtering engine performs filtering actions that determine whether a message or field is processed or excluded from processing.

The actions may range from being general in nature to specific. General actions provide flexibility allowing the scrubbing agent to handle substantially any situation. Specific actions provide simplicity and/or consistency when dealing with frequently occurring situations. A parsing action that separates a message into fields based a supplied delimiter is an example of a general action. A parsing action that searches a field and creates sub-fields for any and all data that appears to be a simple mail transport protocol (SMTP) address is an example of a specific action.

The scrubber configuration provides the information used by the scrubbing agent to locate and scrub PII from messages. In various embodiments, the scrubber configuration provides context information about the data in the messages and the logic for processing the messages based on the context information. The context information indicates where PII is located in log messages or the type of PII. The logic provides instruction on how PII is handled, such as conditions for processing the PII and/or how to protect the PII (e.g., specifying replacement techniques). Collectively, the context information and logic form scrubbing rules. In various embodiments, the scrubbing rules include parsers, processors, and filters, which correspond to the generic actions provided by the scrubbing agent. In some embodiments, the scrubbing rules incorporate the corresponding context information as parameters of the rules. Scrubbing rules may be organized into processing groups. Processing groups allow the operation of one or more rules within the group to be conditioned on the outcome of one or more other rules within the group.

Individual scrubber configurations may be created to handle unique scenarios (e.g., new or different logs, log versions, log types, PII, or PII types) or needs (e.g., alternate outputs for different log consumers) without requiring modifications to the scrubbing agent. New scrubber configurations are easily created, for example, as new scenarios emerge, and existing scrubber configurations are easily modified, for example, when scrubbing requirements change or to protect PII missed by the current scrubber configuration.

The scrubbing agent may send the scrubbed messages 116 to shared storage in a data repository 118. The shared storage is accessible to multiple consumers of the logs. The logs are scrubbed in such a way that relevant records can be used without exposing protected user information to the large number of consumers 120*a* that do not require access to that information for a particular business function. In those cases, information requested from the shared storage is presented as records with fully protected PII 122*a* are presented to those consumers. Similarly, relevant records can be located with limited exposure of protected user information to the smaller number of consumers 120*b* that require access to some but not all of the protected information. In those cases, information requested from the shared storage is presented as records with a limited PII exposed 122*b* are presented to those consumers. Finally, some business functions require full access to the protected information. In such cases, the records with fully exposed PII 122*c* are presented to that limited number of consumers 120*c*.

Locating and handling PII is easier when proper context information is available. Embodiments of the PII scrubbing system include a scrubber-friendly development environment 122 that gathers context information from the originators of the data being logged, the developers 124. Gathering context information about data being collected, which may contain PII and may be logged, by an application during development of that application enhances the completeness, accuracy, and detail of the context information. In addition, gathering context information during application development facilitates the generation of scrubber-friendly logs. The messages in scrubber-friendly logs are organized in such a way that allows PII to be easily located and protected by the scrubbing agent. Further, the combination of scrubber-friendly logs and proper context information facilitates surgical scrubbing of PII from logs.

The developers of a logging agent or logged application are generally in the best position to know the types of data being collected, the different messages that may be produced, and what information may be reported in each message (i.e., the log inputs). In contrast, conventional scrubbing processes are often based on manual reviews of log messages in actual (i.e., production) scrubbed and unscrubbed logs (i.e., the log output) by compliance personnel (e.g., scrubber operators) 126 for data that appears to be PII.

Compliance personnel are constrained by the information they have in front of them, and, as a result, conventional scrubbing process are hampered by issues stemming from factors, such as, but not limited to, incomplete information, ambiguity, and difficulty in isolating PII. One reason for incomplete information is that a particular instance of log may not be a complete representation of all possible messages that might appear in that log. In such case, compliance personnel would not be aware of PII contained in infrequently-appearing messages not actually appearing in the production log being reviewed by compliance personnel. Consequently, the PII would not be scrubbed when it does appear. When context information is gathered on the input side, the occurrence frequency of a message and similar issues resulting in incomplete context information are no longer a factor.

Another concern is that messages may contain ambiguous values that may or may be PII. For example, a value containing four numbers separated by periods could be a version number from a common software version numbering scheme, which is not PII, or an internet protocol version 4 (IPv4) address, which is PII. Similarly, the value "farmer" could represent an occupation, which is not PII, or a name, which is PII. On the output side, compliance personnel must try to infer whether such ambiguous values are PII. If the message containing the ambiguous value also happens to be an infrequently occurring message, the problem is exacerbated. When a clear determination cannot be made, compliance personnel may simply elect to scrub the field containing the ambiguous data out of an abundance of caution to ensure that PII does not go unscrubbed. Ambiguity is removed when context information is supplied on the input side because the developers know what type of information the values represent.

Even in cases where values can be definitively identified as PII, it may be difficult or impossible to scrub the PII without impacting other data. It is common for developers to pack information, including PII, into an unstructured data field because the structured portion of the message system usually only provides space to store information like source and time. The format of the description field is arbitrary and can vary with every log message. Often, the data in the unstructured data field is not labeled because the developers know what the various pieces of information represent. For example, in a situation where an unstructured data field contains both a version number and an IPv4 address, it may not be possible to scrub only the IPv4 address and leave the version number due to the structure of the message and/or the limitations the currently available conventional scrubber. Accordingly, the version number would be unnecessarily scrubbed because the IPv4 address needs to be protected.

Although the conventional scrubber might be updated to address such issues, there is often significant delay (e.g., months) while the scrubber is updated, tested, and deployed before the new version is available to ensure, or at least minimize the risk, that the update will not adversely affect the existing scrubbing process. Further, the update may properly handle the original situation that prompted the update but may be unable to address variations on the theme that may be encountered in other logs (e.g., when the message contains the same information but is structured differently). Generating scrubber-friendly logs using context information obtained on the input side effectively eliminates such problems.

The scrubber-friendly development environment allows entry and tracking of PII metadata 128 associated with scrubber-friendly objects 130 such as, but not limited to, forms, controls and data structures. The scrubber-friendly objects may include PII metadata properties and/or methods enhanced to handle PII metadata. Examples of some of the PII metadata that may be associated with a scrubber-friendly object includes, but is not limited to, an indication of whether the scrubber-friendly object may store PII (e.g., a PII flag), an indication of the type of PII data stored by the object (e.g., a type enumeration), and a name (which may be friendly, meaningful, and/or unique) for the PII value. The PII metadata may also include a review flag that allows developers to indicate that the content of the PII should be reviewed by compliance personnel and/or a comment field that allows developers to communicate additional information about the data. For example, the developer may describe data that is not covered by an existing PII type or explain why the object has been flagged for review.

The PII metadata may be used to automatically generate context information in the form of a parameter key 132. The parameter key may be generated by the development environment or by the logging agent. The parameter key refers to any mechanism used to describe the information, particularly the PII, contained in a document (e.g., the scrubber-friendly log) including, but not limited to, a schema, legend, or key. Table 1 shows one example of a parameter key specifying a message identifier, a parameter name, and a data type. In other embodiments, the parameter key may contain additional information.

TABLE 1

Example of log parameter key

| Message ID | Parameter Name | Type |
|---|---|---|
| 102 | User | 5 |
| 102 | SourceIp | 3 |
| 104 | StartTime | 8 |
| 104 | EndTime | 8 |

The unclassified/generic types like "general user information" and "unknown" serve as flags alerting compliance authorities, quality assurance, or other similar personnel of the need to review message parameters and ensure that they cannot be represented by other specific enumerated data types. The context information provided by the parameter key helps compliance personnel to review logs and develop scrubber configurations based on information provided by developers rather than attempts to find patterns in existing logs.

The PII type may range from a Boolean value (e.g., true/false) indicating whether or not the parameter is user information to a more comprehensive enumeration that provides details about the intended type of user information associated with the parameter or other information about the parameter. Examples of suitable implementations for the data type include, but are not limited to, Boolean values, enumerated types, dictionaries, and lists. Table 2 shows one example of a PII type enumeration covering some of the more common data types.

TABLE 2

Example of a PII type enumeration

| Value | User information Type |
|---|---|
| 1 | e-mail address |
| 2 | general user identifier |
| 3 | internet protocol (IP) address |
| 4 | filename |
| 5 | phone number |
| 6 | organization identifier |
| 7 | general user information |
| 8 | verified to not be user information |
| 9 | unknown |

Over time, previously unsupported data types may be added to the data type enumeration to provide context information for each piece of known user information that needs special processing. In some embodiments, broader data types may be subdivided into more specific data types where the subtypes require different processing. For example, the IP address data type may be broken down into an IP version 4 (IPv4) data type and an IP version 6 (IPv6) data type allowing differentiation between the two address types. The data type flag may be used to generate a separate metadata file that is consumable by the scrubbing agent and other systems that need to consume the log data.

Proper context information indicating where PII may be located allows optimization of the scrubbing process by limiting the number of messages that must be scanned by the scrubbing agent. For example, knowing that only messages with certain message identifiers may contain PII allows the scrubbing agent to safely skip over the other messages, which substantially reduces processing time compared to scanning the entire log. Knowing the type of PII expected can be used to allow the scrubbing agent to select and apply rules for locating and scrubbing the expected PII type. More specifically, when the expected PII type is known, the scrubbing agent can optimize scrubbing by looking only for or beginning with rules targeting the expected PII type in the message, which substantially reduces processing time compared to applying a full set of scrubbing rules to the message in an attempt to locate potential but unknown PII.

In various embodiments, the PII type metadata travels with the scrubber-friendly object allowing other components in the development environment or scrubber-friendly applications to interact with the scrubber-friendly object in a way that facilitates protection of the PII. For example, methods that log or write data to a file may recognize that the data contains PII based on the metadata and protect the PII (e.g., redact, hash, or encrypt) before writing to the log or file unless the command expressly authorizes saving unprotected PII. In various embodiments, the logging agent is responsive to the PII metadata. Accordingly, the logging agent is aware of types of information, including PII, appearing in the message being generated. Such logging agents may generate scrubber-friendly logs, which are easy to create, usable, and have a predictable format that allows user information to be targeted for scrubbing by the PII scrubbing system.

While the scrubber-friendly development environment provides a mechanism to overcome many of the limitations inherent in reviewing of production logs to gathering context information, production log reviews remain a viable option to obtain basic context information suitable for use with the scrubbing agent and/or generate scrubber configuration files. This is particularly true when context information cannot be gathered during development (e.g., logs from applications no longer being developed or being developed outside of the organization's control).

FIG. 2 is a high level flowchart of one embodiment of a surgical scrubbing method for protecting PII using the PII scrubbing system. The surgical scrubbing method 200 begins with a context gathering operation 202 that collects information about the locations and types of PII found in a log. The context information may be provided when the log is created (e.g., by the developers) or determined from an analysis of existing logs (e.g., by compliance personnel).

In a generate configuration operation 204, the context information is used to generate a scrubber configuration associated with a log or log type. The scrubber configuration contains instructions on where to locate and how to process PII in the log messages. The scrubber configuration may be refined over time based on analysis of logs scrubbed using the scrubber configuration. The scrubber configuration is made available to the scrubbing agent for use when processing messages from the associated log. In various embodiments, scrubber configurations are stored in a centralized configuration repository. In some embodiments, copies of the scrubber configurations from the configuration repository are deployed to systems running the scrubbing agent, and the scrubbing agent uses the local copy of the scrubber configuration. If an existing scrubber configuration is modified or a new scrubber configuration is created, those scrubber configurations may be uploaded to the configuration repository where they can be redeployed to other systems.

In a log generation operation 206, the logging agent generates messages that may contain PII. Embodiments of the log generation operation produce scrubber-friendly logs with parseable messages allowing PII to be easily located. For example, the logging agent may not allow the caller to select the location of parameters. In other words, the logging agent does not simply accept a developer created text string for an unstructured data field. Instead, the logging agent may encourage developers to supply the content of the log message in an organized fashion. For example, the logging agent may accept a text message and a series of name/value pairs from the caller and produce a formatted message with all of the delimiters escaped out of the input parameters. In various embodiments, scrubber-friendly logs may contain messages that conform to the following format:

{Free form text}: {Name1}={Value1}; {Name2}={Value2};

For example:

User logged in: User=jdoe; SourceIp=10.1.50.103

In some embodiments, the logging agent may limit the length of the text message but accept any number of name/value pairs or scrubber-friendly objects as arguments. The logging agent may then format the name/value pairs with delimiters (e.g., default or developer supplied-delimiters) to the unstructured data field. When references to scrubber-friendly objects are passed as arguments, a name argument may not be required. Instead, the logging agent may obtain the corresponding name from the PII metadata or may use a standardized name based on the PII type. Standardizing names may be used to make log messages more predictable, which makes it easier to locate and protect the PII in the messages. Using the general user identifier data type as an example, a developer provided name might choose name like "user_id," "user," "username," "user_name," name," "login," or other descriptor. Compared to unlabeled data in the unstructured data field, these names do provide an easy way to identify PII that should be scrubbed; however, the potential variations, including misspellings, reduce the effectiveness of automated PII scrubbing logic, without additional information. In various embodiments, the parameter key includes a message identifier that indicates a particular message containing the data, a name used to locate the corresponding PII value (i.e., the name in the name/value pair), and the PII type; however, other information may be included, such as a column index. The parameter key provides an alternative to standardized naming by identifying and linking the name and the data type associated with the PII.

The message presentation operation 208 presents log messages to the scrubbing agent for processing. The logging agent may send messages to the scrubbing agent or the scrubbing agent may retrieve messages from the log. The messages may be accessed individually or in groups. For example, the logging agent may send each message to the scrubbing agent as it is generated. Alternatively, the logging agent may send a collection of messages when the data stream is closed. In another example, the scrubbing agent may read the log on a periodic basis (e.g., hourly or daily) and process any new messages that have been added since the last time the log was read.

The get scrubber configuration operation 210 provides the scrubbing agent with the scrubber configuration (i.e., the rules and context information) needed to scrub the messages. In some embodiments, different scrubber configurations are provided for different logs or log types, and the appropriate scrubber configuration is loaded based on an identification of the log. In other embodiments, a global scrubber configuration contains rule sets for multiple logs or log types, and the appropriate rule set is applied based on an identification of the log.

The message scrubbing operation 212 locates and replaces PII in the message using the rules and context information provided by the scrubber configuration. Following the message scrubbing operation, an optional post-processing operation 214 may prepare the message for storage in the data repository. In various embodiments, the post-processing operation includes an optional annotation operation that annotates the message with additional information that is needed to properly interpret the messages once they have been added to the data repository. For example, the message received by the scrubbing agent may not include a time or date stamp allowing the message sequence to be reconstructed once added to the data repository, so the annotation operation may add the time or date stamp or a sequence number to the message. Other information that may be added to the message includes information such as the message source (e.g., a server identifier). The post-processing operation may also optionally include a compatibility operation that places the message in a format that is compatible with requirements of the data repository. For example, the data repository may require all data to be stored as strings. Accordingly, the message may be serialized, encoded, or otherwise formatted before being transmitted to the data repository.

Finally, a protected record storage operation 216 sends the scrubbed message with the PII in a protected format to the data repository. Once in the data repository, the scrubbed messages are available for use by various consumers of the data.

FIG. 3 is a high level flowchart of one embodiment of the collect context information operation of the surgical scrubbing method for collect context information about PII in a scrubber-friendly development environment. The scrubber configuration method 300 begins with a PII metadata creation operation 302 links information about the type of PII to a scrubber-friendly object in the scrubber-friendly development environment. When scrubber-friendly object is created, the PII type may default to an unclassified/generic type that will require review. The developer may manually update the PII type to reflect the type of PII likely or intended to be stored by the object. The PII type may be automatically updated when related attributes of the object are changed. For example, if field mask or format corresponding to a telephone number is applied to a scrubber-friendly control, the PII type would change to indicate the value is a phone number.

A metadata porting operation 304 involves moving the PII metadata with the scrubber-friendly object allowing components in the development environment or scrubber-friendly applications to take advantage of context information. As described herein, the logging agent may use the PII metadata associated with the information being logged to generate scrubber-friendly logs that enable surgical scrubbing by the scrubbing agent based on the supplied scrubber configurations.

A parameter key generation operation 306 produces one or more parameter keys (i.e., reports) providing details about the information collected by the logged application based on the underlying PII metadata. The reports may detail all scrubber-friendly objects or be limited to scrubber-friendly objects that are passed as arguments to the logging agent or a logging method. In various embodiments, parameter keys are generated by the development environment when the logged application is compiled and/or on demand. In some embodiments, parameter keys are built by the logged application or the logging agent as the log is generated and may be produced on demand. Parameter keys may be produced in multiple formats. For example, one version appearing in a human-friendly format (e.g., a tabular format) for use by human reviewers and an alternate format better suited for use by a software application, such as the logging agent or the scrubbing agent, may be provided. Examples of alternate formats include, but are not limited to, comma separated values and Extensible Markup Language (XML).

Figure 4:
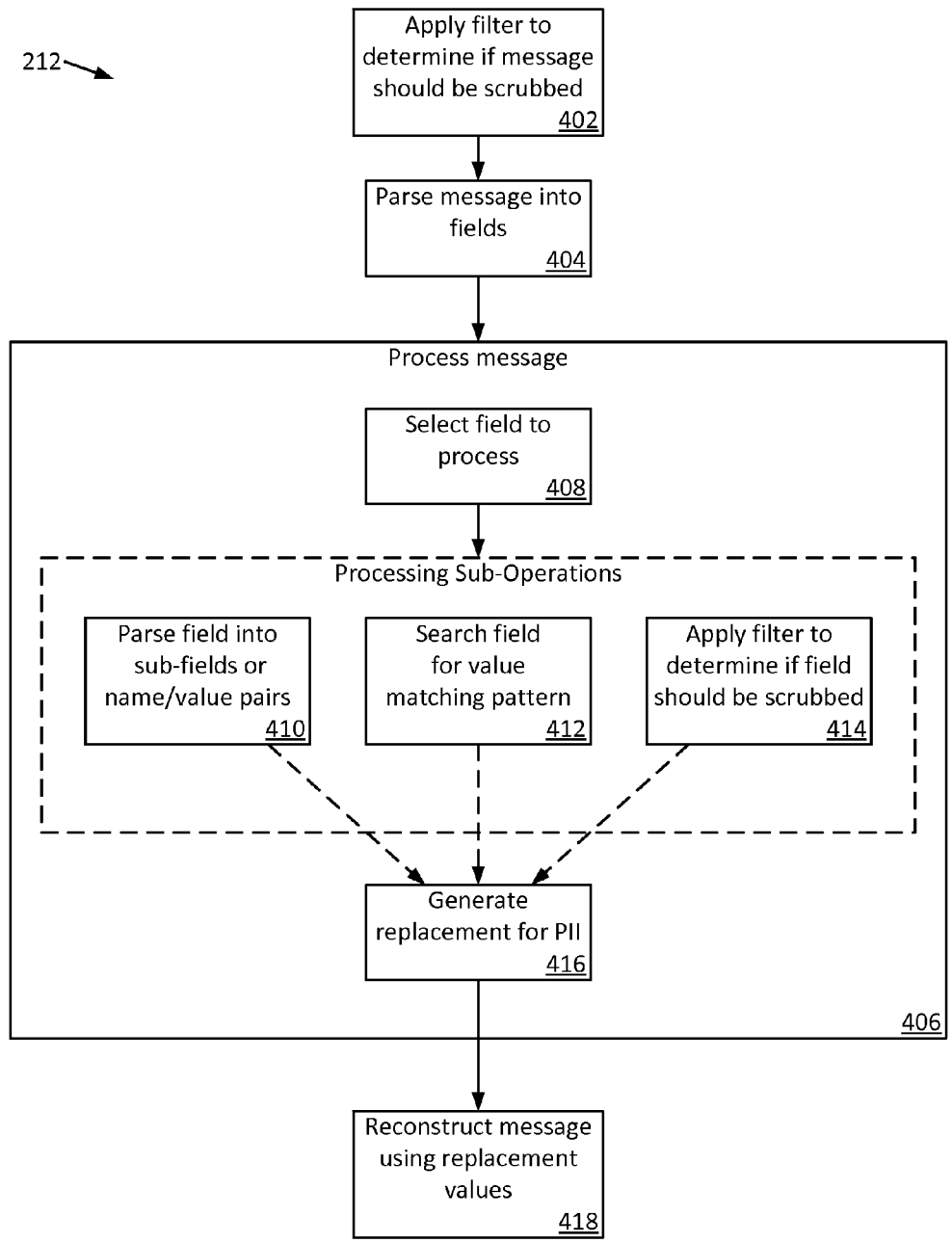
FIG. 4 is a high level flowchart of one embodiment of the message scrubbing operation of the surgical scrubbing method.

FIG. 4 is a high level flowchart of one embodiment of the message scrubbing operation 212. An optional pre-parsing filtering operation 402 determines if the message should be processed based on whether the content in the message matches filter parameters (e.g., a pattern) specified in the scrubber configuration. A message parsing operation 404 parses the message into fields based on parser parameters specified in the scrubber configuration. A processing operation 406 protects the PII based on processor parameters specified in the scrubber configuration. A field selection operation 408 selects the field to scrub. The processing operation may involve one or more sub-operations that impose scrubbing conditions or refine how the selected field is processed. The sub-operations may include a field parsing operation 410 or a search operation 412 used to locate PII within the selected field. The field parsing operation parses a field into sub-fields or name/value pairs. The search operation that looks for content in the selected field that matches filter parameters (e.g., a pattern) specified in the scrubber configuration. The sub-operations may also include a filtering operation 414 that determines if the selected field should be processed based on whether the contents of a field in the message matches filter parameters specified in the scrubber configuration.

Subject to satisfying any conditions imposed by a sub-operation, a replacement value generation operation 416 generates a replacement value for the PII in the selected field. The choice of replacement technique is often a balancing act between minimizing data loss, reducing the impact on performance, and managing data bloat. Examples of the available replacement techniques include, but are not limited to, redaction, static substitution, generalization, hashing, and encryption.

Redaction is the act of deleting the PII from the message entirely with no indication that PII ever existed. Redaction is very fast but rarely appropriate. Static substitution is the act of replacing the PII with a static marker indicating that PII was removed but not offering any indication of what the PII value was. Static substitution is also very fast and is detectable but leaves no useable information concerning the PII.

Generalization is act of replacing the PII with a generalized value that may allow identification of the group or category to which the individual belongs without identifying the individual. Generalization may replace the portions of the PII with wildcards or use a lookup table or function to map individuals into groups. For example, a telephone number might be generalized by replacing the last four digits with an asterisk or an IP addresses might be generalized with a lookup that finds the country associated with the IP address to expose the user's generalized location (i.e., the country) rather than the user's IP address. Generalizations are generally irreversible and result in some information loss.

Hashing is the act of replacing the PII with a hash code. The hash code is a unique value generated using a one way hash that represents but does not identify the user. In other words, each different hash code identifies a different user but the hash code itself provides no actual user information. A reference value may be correlated with the hashed PII using the hash key allowing authorized users to find corresponding entries in the logs. For example, to locate the log entries associated with a particular user, the user id for that user may be hashed using the same key originally used to hash the logs. The logs may then be searched for that hash key instead of the user name.

Encryption is the act of applying a cipher to encrypt and protect the PII. A decryption key is required to decrypt the cipher text and access the protected PII. Encryption preserves the original PII but generally has the highest processing cost.

In various embodiments, combinations or multiples of the redaction techniques may be used. For example, a single PII value might have multiple generalizations and so the PII redaction should support more than one generalization per redaction. Using multiple replacement techniques provides the scrubbed data in multiple formats and allows personnel with different access levels and needs to utilize the data while exposing only the amount of PII necessary.

Surgical scrubbing of PII allows consumers to get a large amount of information from a scrubbed log with no or, in some cases, limited access to the PII. Some consumers may only need to get a count of users or pull information for a particular region or a specific user. Often the necessary information can be obtained using the correlation between the hash values. For example, log messages containing paths scrubbed in this manner are returned by a search for the hash value corresponding to a particular user name (e.g., jdoe) or file name (e.g., letter to smith.docx) instead of having to search for every possible path that could contain the data. However, this only works when the hashes are produced solely on the PII. Consider the following log messages showing an example of PII is surrounded by unstructured data:

User jdoe logged in.
Created file c:\users\jdoe\documents\test.docx.
User registered email address jdoe@hotmail.com.

Without a way to predictably and efficiently locate the PII, the entire value will be protected. The hashes for "jdoe," "c:\users\jdoe\documents\test.docx," and "jdoe@hotmail.com" are completely different and cannot be correlated. Even though all of the messages refer to the same user, there is no way to use the hashes to find this data. In order to use this data, the consumer must download and decrypt each message exposing any other PII that it may contain.

The power and flexibility offered by the scrubber configurations allow the scrubbing agent to be configured to precisely target only the PII for replacement and leave the surrounding non-personal information untouched, even when the PII is mixed with non-personal information in unstructured data. For example, when processing a log from an operating system having user profile specific file names, the scrubbing agent may be configured to only scrub the parts of the path that are specific to the user (e.g., the user name and the file name). Thus, the path "c:\users\jdoe\documents\letter to smith.docx" becomes "c:\users\###\documents\###," which leaves more information intact and provides greater opportunity for analysis than if the entire path is protected in a single redaction. Similarly, knowing that the data represents an e-mail address, the user name and domain name may be independently redacted so that both parts can be separately correlated. Moreover, the use of scrubber-friendly logs further enhances the surgical scrubbing ability of the PII scrubbing system.

In some embodiments, the scrubbing agent stores a reference to the PII rather than calculating and storing PII every time it is required for frequently repeated user information, such as account names and IP addresses. The efficiency of storing a reference to the PII increase as amount of data processed by the scrubbing agent increases, for example, in a centralized scrubbing agent having an entire system dedicated to PII scrubbing. In various embodiments, the scrubbing agent includes a PII hash to encrypted PII map used to a lookup a reference to the previously encrypted value. In other words, only PII that has not been previously encountered has to be encrypted, which reduces processing time. Bloat in the scrubbed logs may be reduced by storing a GUID style identifier instead of the hash and cipher text. Overall efficiency may be increased by using normalized PII values to substantially improve the hit ratio but comes at the cost of the potential loss of some detail when recreating the log with the normalized PII instead of the original PII.

Replacing a substring with a PII tag makes reporting more complicated and less efficient because the string has to be searched for the PII tag. To minimize the efficiency loss, embodiments of the scrubbing agent places the PII in a separate field that can be independently searched. Some embodiments place a marker in scrubbed data indicating the location of the PII and store the PII replacement at the beginning of the string. This allows the reporting system to quickly identify that the string contains protected PII and start finding the hash sooner when correlation is needed to increase response time.

While parameter keys and scrubber-friendly logs are useful components, they will not always be available. For example, the logs to be scrubbed may come from sources over which the organization has no control and, therefore, are not provided as scrubber-friendly logs and/or with parameter keys. The operation of the scrubbing agent in the absence of appropriate context information or when the expected PII type is not found depends upon the selected balance between thoroughness in protecting PII and efficiency in scrubbing logs (i.e., the amount of processing time). In various embodiments, the scrubbing agent may attempt to determine the actual PII type and apply corresponding scrubbing rules if the expected PII type is not found. In other embodiments, the scrubbing agent only scans messages for the expected PII type and simply moves on the next message if the expected PII type is not found.

Following the generation of replacement values, a scrubbed message reconstruction operation 418 a reconstructs the message substituting the replacement values for the PII.

Figure 5A:
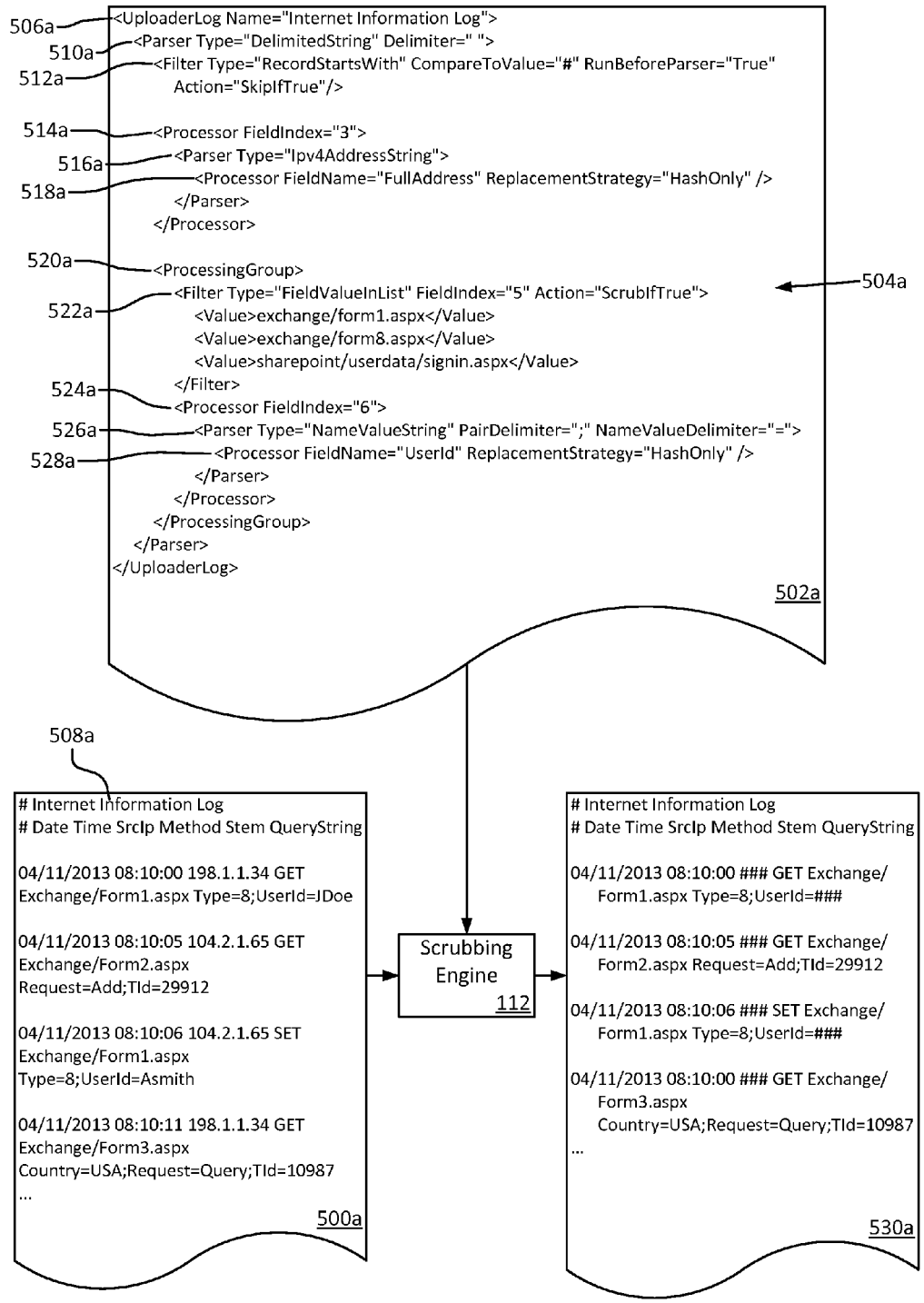
FIG. 5A is a flow diagram illustrating a scrubbing operation performed by one embodiment of the PII scrubbing system on a first log with a corresponding scrubber configuration.

FIG. 5A is a flow diagram illustrating a scrubbing operation performed by one embodiment of the PII scrubbing system on a first log with a corresponding scrubber configuration. In the illustrated embodiment, the scrubbing agent receives a first log 500*a* and a corresponding scrubber configuration 502*a* as inputs. The scrubber configuration contains the scrubbing rules applicable to a corresponding log, i.e., the rule set 504*a*. The illustrated embodiment shows the scrubber configuration implemented using a markup language such as, but not limited to, XML; however, the scrubber configuration may be implemented in other formats.

In various embodiments, the corresponding scrubber configuration is provided with the log by the logging agent. In some embodiments, the scrubbing agent selects the corresponding scrubber configuration from a repository of available SCs when a log is received. In such instances, the logging agent may provide a log identifier. For example, the logging agent may provide the log identifier when making a connection to the scrubbing agent and/or the log identifier may be incorporated into the log. The log identifier may be a general or specific identifier that indicates the log, the log-type, the logging agent that created the log, the corresponding scrubber configuration, or any other information that may be used to match the log with the corresponding scrubber configuration that the scrubbing agent should use when processing the log. The corresponding scrubber configuration may be selected by matching the log identifier with a configuration identifier 506*a* in the scrubber configuration. In the illustrated embodiment, the first line of the log carries the log identifier 508*a*.

The configuration identifier may also act as a container for a log identifier-specific rule set. In some embodiments, the scrubber configuration may include rule sets for multiple logs with each rule set identified using a unique configuration identifier, and the scrubbing agent selects the appropriate rule set by matching the configuration identifier and the log identifier.

Embodiments of the PII scrubbing system utilize a signal 510*a* to indicate that the scrubber configuration contains a rule set. If the signal is not present in the scrubber configuration, the scrubbing agent may flag the log for operator review, revert to default (e.g., hard-coded) scrubbing rules based on the log identifier, and/or ignore the log. In various embodiments, the rule set includes a root parsing rule as the signal. The root parsing rule contains the instructions on how to separate each line of the log into fields. For example, the root parsing rule may include a delimiter that is used by the scrubbing agent to separate each message into fields or a message identifier that instructs the scrubbing agent to use a predefined parsing algorithm to separate a common message format into fields. The individual fields are addressable by their index. In some embodiments, a predefined parsing algorithm may provide a field name that may be used to address a specific field. The root parsing rule effectively operates as the primary processing group that contains all of the rules for a given rule set.

For illustrative purposes, a simplified version of an internet information log is shown as a representative log. The internet information log has six columns (i.e., fields) delimited with spaces. The third column contains an IP address, which is considered PII, and the sixth column contains a query string, some of which potentially contain PII.

The root parsing rule specifies that each message should be parsed into fields using a space (" ") as a delimiter. The filter 512*a* specifies that messages should be evaluated before being parsed and any message beginning with "#" character (e.g., a comment) should be skipped.

The first processor 514*a* is a conditional rule operating on the third field and includes a search parser 516*a*. The search parser instructs the scrubbing agent to find anything that matches a selected pattern in the target field. For convenience and consistency, the scrubbing agent may have predefined search parsers for selected data types. Examples of predefined search parsers include, but are not limited to, common data types such as general internet protocol (IP) addresses, version specific IP addresses (e.g., IPv4 and IPv6 addresses), and SMTP addresses. In some embodiments, a custom search parser may be specified in the scrubber configuration using an expression language to define the search pattern (e.g., regular expression).

Nested with the search parser is a result processor 518*a*. The result processor specifies how the results returned by the search processor are handled. The result processor may specify the instances of data matching a selected pattern that should be protected. For example, the result processor may specify that all instances of the data type in the field or only the second instance of the data type in the field should be protected. The result processor may also specify the portion of a matching data item that should be protected. For example, in the case of an IPv4 address, the result processor may instruct the scrubbing agent to only scrub the last segment. In the illustrated embodiment, the search parser instructs the scrubbing agent to find IPv4 addresses in the target field, and the result processor specifies that each IPv4 address returned by the search parser should be scrubbed by hashing the full address.

The rule set also defines a processing group 520a. The processing group instructs the scrubbing agent to process a group of rules together. For example, a processing group may include a filter selecting messages meeting specified criteria and a processor operating on the selected messages. In the illustrated embodiment, a filter 522a in the processing group specifies that only messages containing certain values in the fifth field are subject to the additional rules in the processing group. A top-level processor 524a in the processing group specifies that the nested rules operate on the sixth field. With the top-level processor, a field parser 526a specifies that the target field should be parsed into name/value pairs, where the pairs are delimited by an ampersand ("&"), and names and values in the pair are delimited by an equal sign ("="). The parser result processor 528a specifies that only the value paired with the name "UserId" should be scrubbed by hashing the value. Running this scrubber configuration on the records from the internet information log produces the protected records as an output 530a. For readability, the lengthy PII replacements (e.g., the hash values) are represented by "###".

Figure 5B:
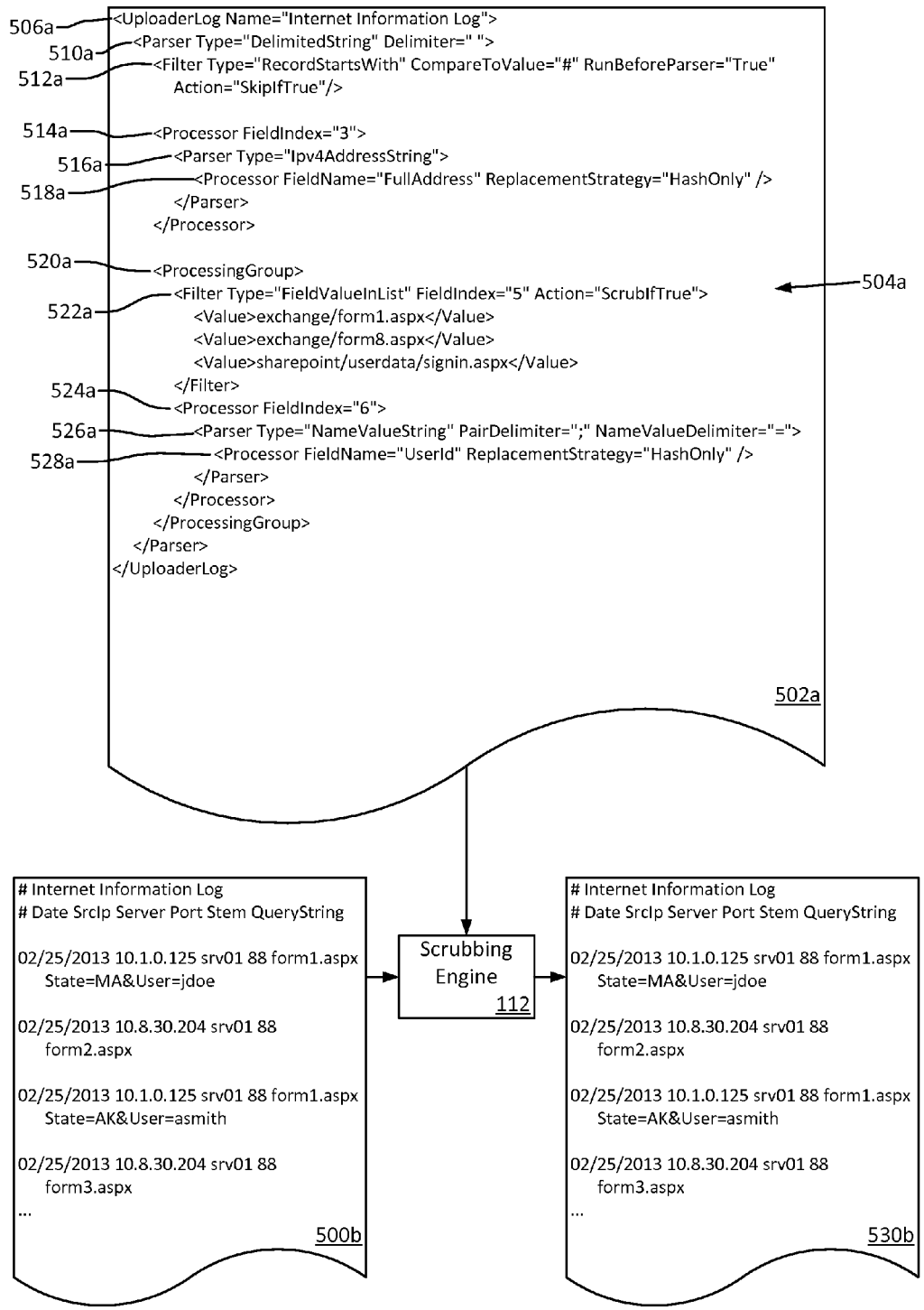
FIG. 5B is a flow diagram illustrating the scrubbing operation performed by one embodiment of the PII scrubbing system on a second log using the same scrubber configuration from the previous example.

FIG. 5B is a flow diagram illustrating the scrubbing operation performed by one embodiment of the PII scrubbing system on a second log using the same scrubber configuration from the previous example. The second internet information log 500b has six fields delimited with spaces. As in the first internet information log, each message contains an IP address, which is considered PII, and the sixth column contains a query string, some of which potentially contain PII, but the messages in the second internet information log differ in small, but significant respects.

Running the scrubber configuration on the records from the internet information log produces the protected records as an output 530b. In this case, the IP address appears in the second field, which is not scrubbed. The server name in the third field does not match pattern searched for by the IPv4 search parser, so it is not scrubbed. Had a simple field replacement processor been in place (e.g., <Processor Field-Index="3" ReplacementStrategy="HashOnly" />), the server name would have been unnecessarily scrubbed. Finally, the name "User" does not match the rule, and the associated value is not scrubbed. For readability, the lengthy PII replacements are represented by "###".

Figure 5C:
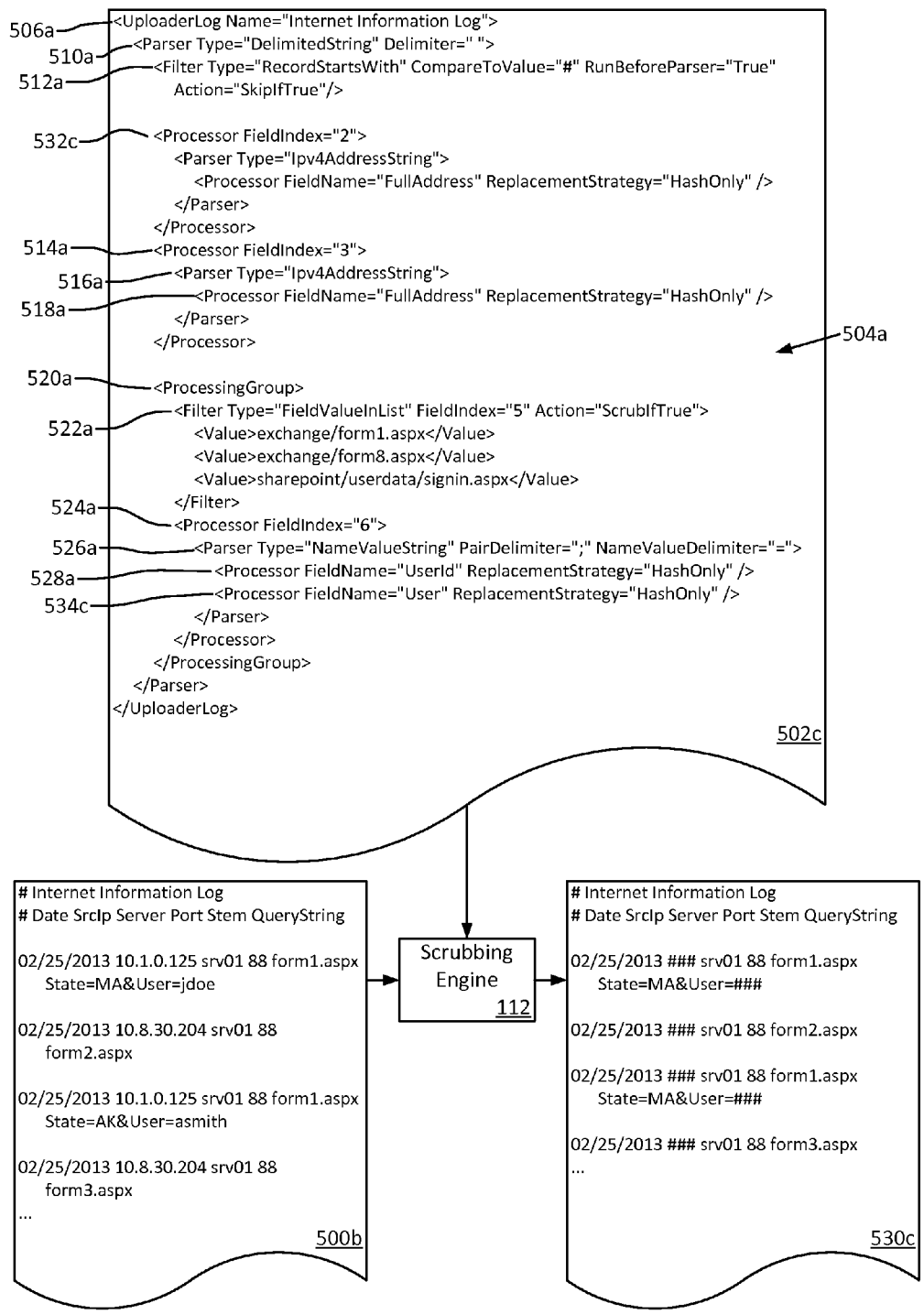
FIG. 5C is a flow diagram of a scrubbing operation performed by one embodiment of the PII scrubbing system illustrating the result of falling back to default scrubbing rules when the scrubber configuration does not provide a rule set.

FIG. 5C is a flow diagram of a scrubbing operation performed by one embodiment of the PII scrubbing system on the second log using a modified version of the scrubber configuration. In this instance, the modified scrubber configuration 502c includes an additional processor 532c to operate on IPv4 addresses in field 5. Further, a result processor 534c specifying that a value paired with the name "User" should be scrubbed has been added to the processing group. As a result, the second processor now scrubs both the "UserId" and "User" values. Other variations may be used to achieve the same result. For example, if the scrubber accepts wildcards, a parameter such as "User*" (where "*" is a wildcard) could have been used in the original conditional processor to achieve the same result. The output 530c obtained when running the modified scrubber configuration on the records from the second internet information log now results in the PII being protected and illustrates the flexibility of the PII scrubbing system. As before, the lengthy PII replacements (e.g., the hash values) are represented by "###" for readability.

Figure 5D:
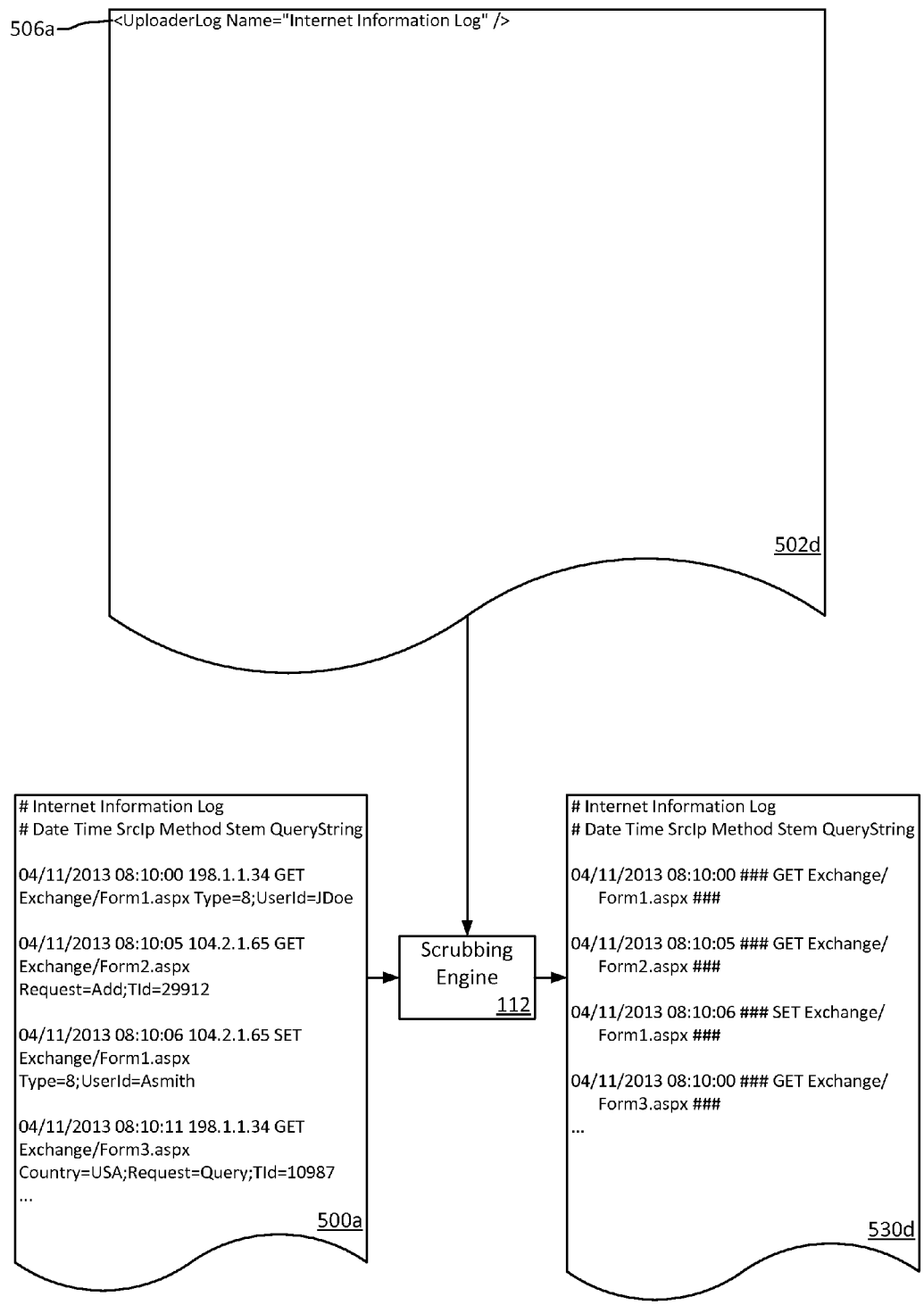
FIG. 5D is a flow diagram of a scrubbing operation performed by one embodiment of the PII scrubbing system on the second log using a modified version of the scrubber configuration.

FIG. 5D is a flow diagram of a scrubbing operation performed by one embodiment of the PII scrubbing system illustrating the result of falling back to default scrubbing rules. In this case, the scrubber configuration 502d does not provide a rule set. Embodiments of the PII scrubbing system may incorporate the hard-coded logic from a conventional scrubber or may be built using a conventional scrubber as a base. While not ideal, the hard-coded logic from a conventional scrubber allows the PII scrubbing system to continue to scrub PII when a rule set is not provided.

The default scrubbing rules for this particular internet information log have hard-coded logic that always scrubs the third and sixth columns (i.e., the IP address and the query string). The default scrubbing rules may allow the scrubbing agent to recognize certain types of PII, but there is no opportunity to specify the PII type. Scrubbing an IP address is a fairly routine task, but scrubbing a query string is another matter. Accordingly, the entire query string will be scrubbed (e.g., encrypted and hashed) as a single instance of PII unless the default scrubbing rules happen to cover the query string. Moreover, while only certain query strings contain PII, all of the query strings will be scrubbed. The output 530d obtained using the default scrubbing rules obfuscates the entire value of every query string even though only some of the rows and only part of the query strings contain PII. Again, for readability, the lengthy PII replacements (e.g., the hash values) are represented by "###".

This scenario using the default scrubbing rules also presents a classic example of over-scrubbing, which is the act of protecting non-sensitive data. Over-scrubbing is currently the largest culprit in the high cost of processing, storing, and using the data because it burns processor time, increases the log size, and makes it impossible to run reports that use the data contained in the query string. The reason for the increase in log size is that each instance of PII, no matter how small, results in the creation of a replacement value similar to the following:

<PII:H101
 (6BAt0ovxxwocsXiPsI19PzYJ4wnRguL7t26IGmj8H
 Os=):E103(rrm    LUjprk8wKxZqxieqXwCJerfUq
 SlmbdVscoq1sH2E=)>.

Two common reasons for over-scrubbing include an inability to tell which rows or columns actually contain PII and the lack of an efficient way to target just the PII. Accordingly, larger sections of the data end up being scrubbed to avoid the risk of PII leaking through to the uploaded data.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
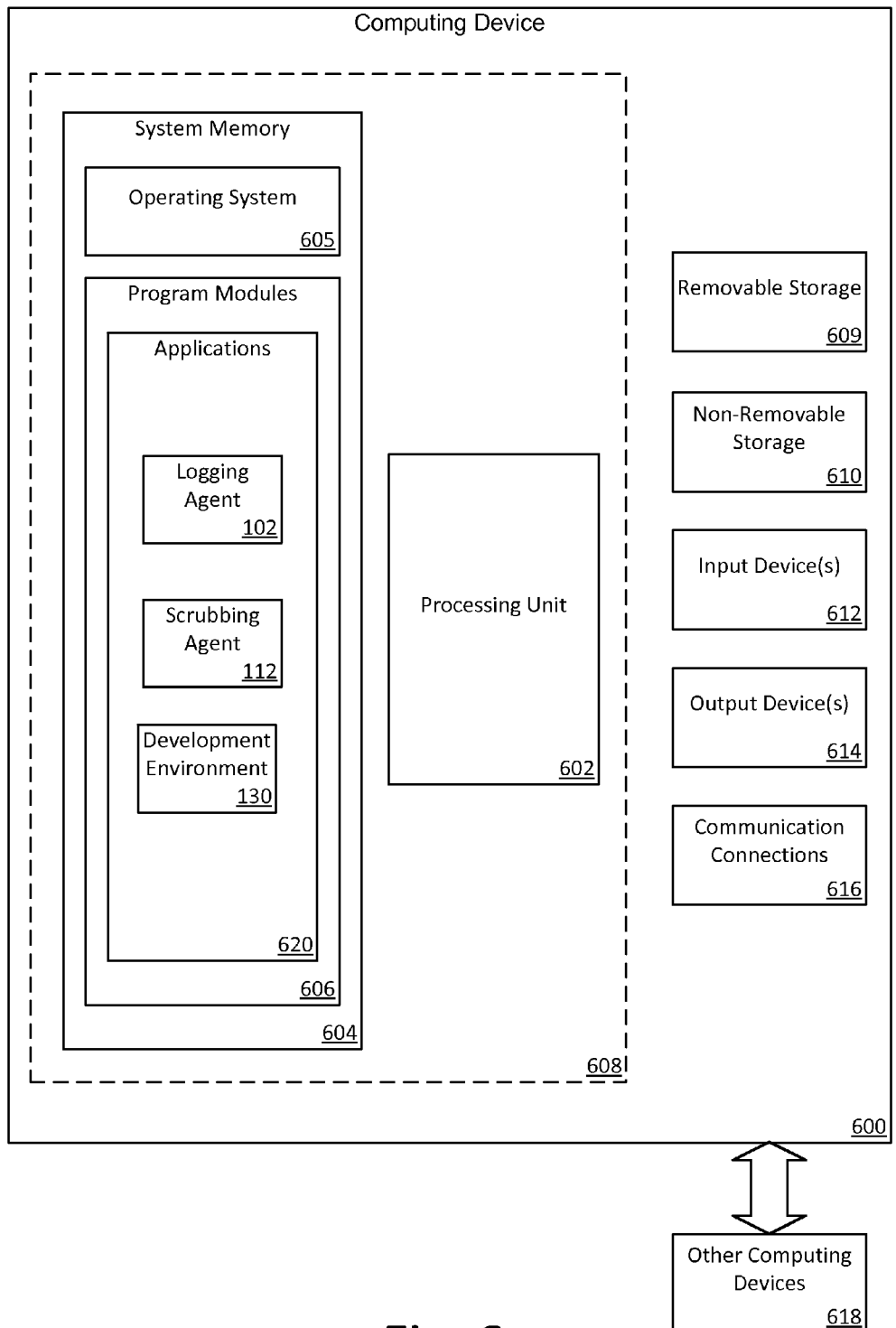
FIG. 6 is a block diagram illustrating one embodiment of the physical components of a computing device with which embodiments of the present invention may be practiced.

FIGS. 6 and 7 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 6 is a block diagram illustrating physical components (i.e., hardware) of a computing device 600 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as the logging agent 102, the scrubbing agent 112, and the development environment 130. For example, the operating system 605 may be suitable for controlling the operation of the computing device 600. Furthermore, embodiments of the invention may be practiced in conjunction with a graphics library, other operating systems, or any other application program and is not limited to any particular application or system. This basic configuration is illustrated by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated by a removable storage device 609 and a non-removable storage device 610.

As stated above, a number of program modules and data files may be stored in the system memory 604. While executing on the processing unit 602, the software applications 620 may perform processes including, but not limited to, one or more of the stages of the surgical scrubbing method 300. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 620 may be operated via application-specific logic integrated with other components of the computing device 600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all examples of computer storage media (i.e., memory storage.) Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600.

Figure 7A:
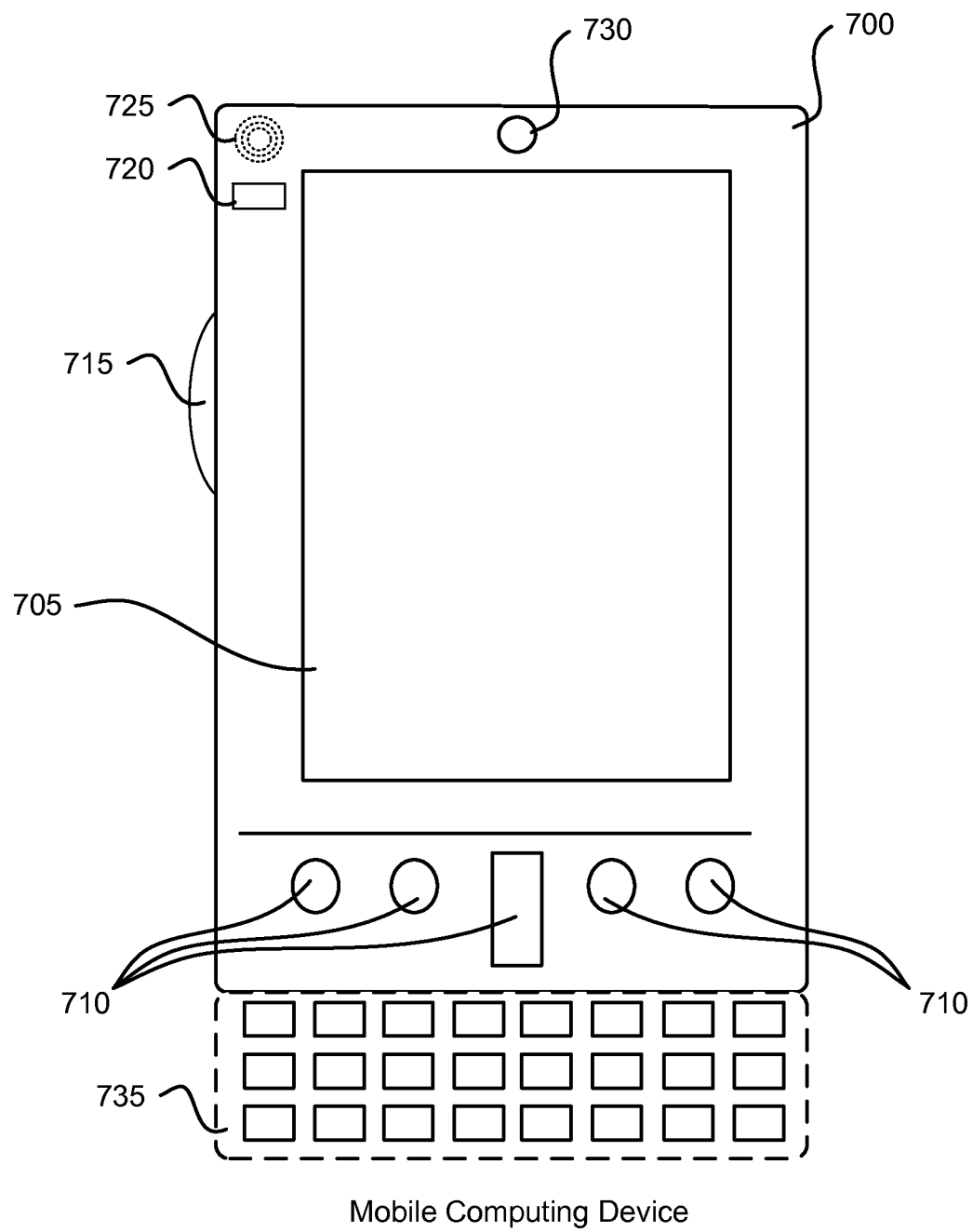
FIGS. 7A and 7B are simplified block diagrams of a mobile computing device with which embodiments of the present invention may be practiced.
Figure 7B:
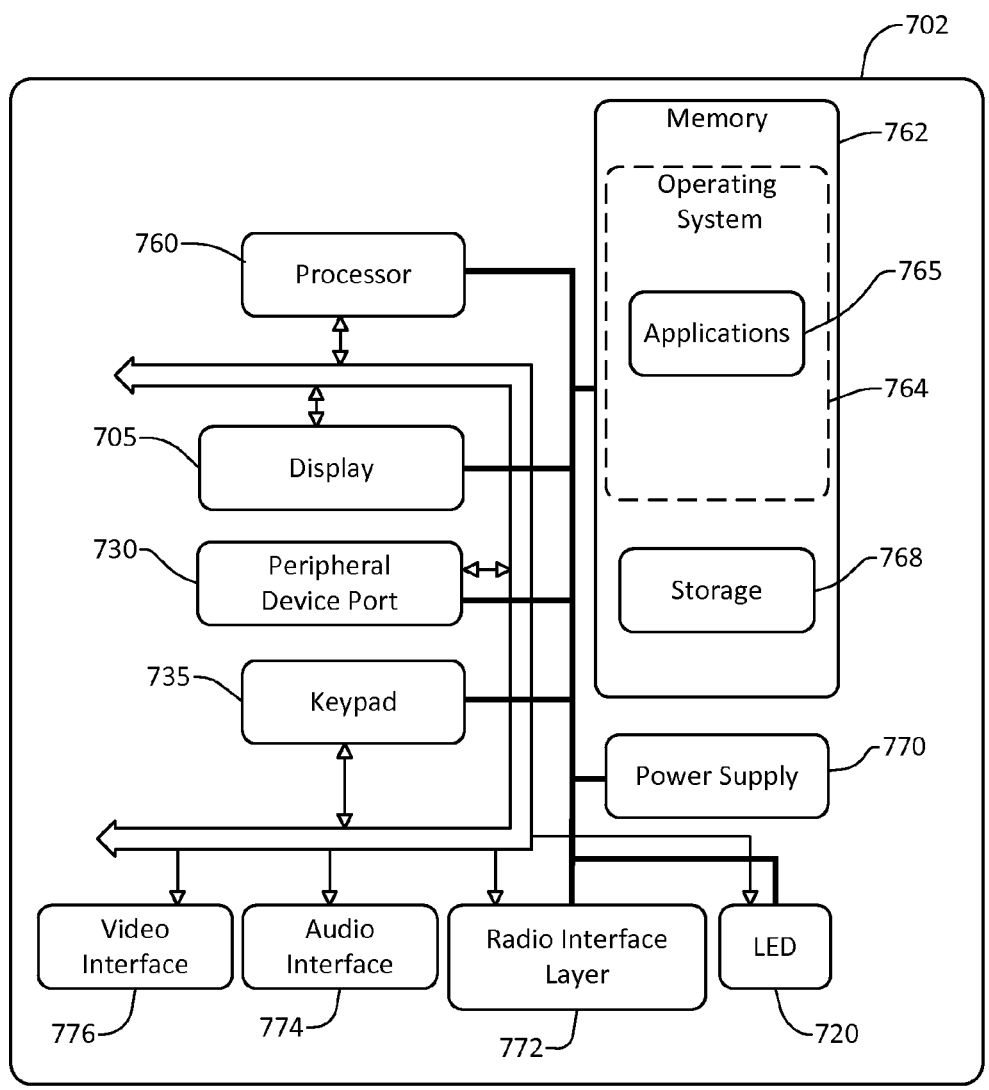

FIGS. 7A and 7B illustrate a mobile computing device 700 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface, a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a smart phone capable of running one or more applications (e.g., browsers, e-mail clients, notes, contact managers, messaging clients, games, and media clients/players). In some embodiments, the system 702 is integrated as a computing device, such as an integrated personal digital assistant (PDA) and wireless phone.

One or more application programs 765 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 765 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including software applications 620 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the outside world via a communications carrier or service provider. Transmissions to and from the radio 772 are conducted under control of the operating system 764. In other words, communications received by the radio 772 may be disseminated to the application programs 765 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
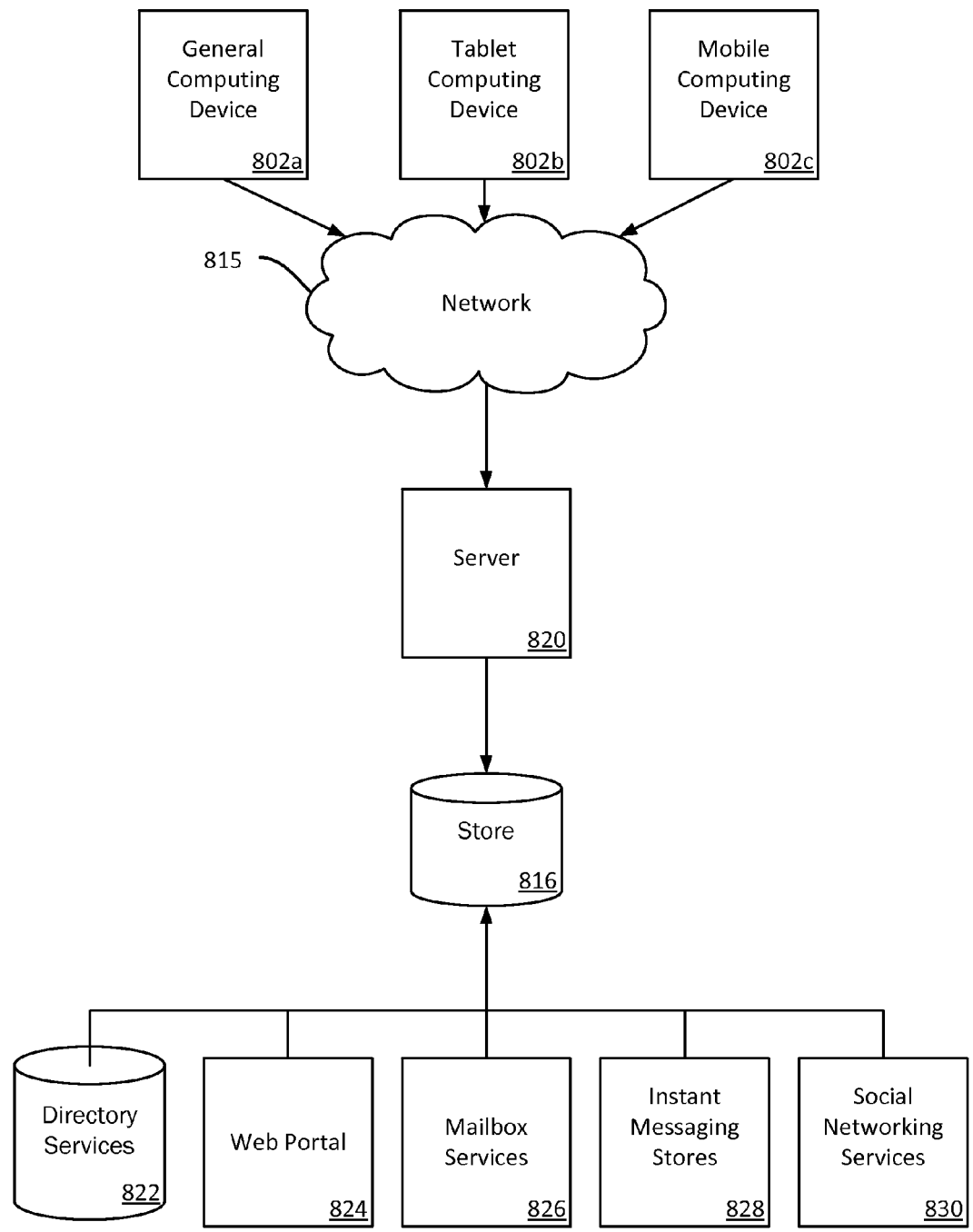
FIG. 8 is a simplified block diagram of a distributed computing system in which embodiments of the present invention may be practiced.

FIG. 8 illustrates one embodiment of the architecture of a system for providing PII scrubbing system functionality to one or more client devices, as described above. Content developed, interacted with, or edited in association with the software applications 620 may be stored in different communication channels or other storage types. For example, various documents may be stored using a directory service 822, a web portal 824, a mailbox service 826, an instant messaging store 828, or a social networking site 830. The software applications 620 may use any of these types of systems or the like for enabling data utilization, as described herein. A server 820 may provide the software applications 620 to clients. As one example, the server 820 may be a web server providing the software applications 620 over the web. The server 820 may provide the software applications 620 over the web to clients through a network 815. By way of example, the client computing device may be implemented as the computing device 600 and embodied in a personal computer 802a, a tablet computer 802b, and/or a mobile computing device (e.g., a smart phone) 802*c*. Any of these embodiments of the client device may obtain content from the store 816.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of scrubbing a data set having messages containing both non-personal data and personally identifiable information, the method comprising:
    loading a message containing both non-personal data and personally identifiable information;
    loading a scrubber configuration containing a rule set for scrubbing the data set;
    parsing the message into fields based on the rule set, wherein unstructured data fields are formatted and delimiters are added to the unstructured data field such that personally identifiable information is identifiable from unlabeled data;
    scrubbing only the personally identifiable information in the message based on the rule set to produce a scrubbed message, the personally identifiable information being associated with metadata that identifies a type of personally identifiable information, and applying a corresponding scrubbing rule to the type of personally identifiable information, the corresponding scrubbing rule including:
        generating replacement values for the personally identifiable information in the message based on the rule set, including generating a replacement value for a first instance of specific personally identifiable information in the message based on the corresponding scrubbing rule and storing a reference to the replacement value associated with the specific personally identifiable information; and
        substituting replacement values for the personally identifiable information in the message to create the scrubbed message, including retrieving the replacement value associated with the specific personally identifiable information using the reference when additional instances of the specific personally identifiable information are encountered, and using the retrieved replacement value for the additional instances of the specific personally identifiable information; and
    saving the scrubbed message.

2. The method of claim 1 wherein the rule set comprises a root parsing rule and child rules for scrubbing the data set.

3. The method of claim 2 wherein the act of scrubbing the personally identifiable information in the message based on the rule set to produce a scrubbed message further comprises:
    parsing the message into fields based on the root parsing rule; and
    scrubbing the personally identifiable information in selected fields of the message based on the child rules.

4. The method of claim 3 wherein the act of parsing the message into fields based on the root parsing rule further comprises splitting the message into fields based on a delimiter specified in the root parsing rule.

5. The method of claim 3 wherein the act of parsing the message into fields based on the root parsing rule further comprises splitting the message into a predefined set of fields based on a message type specified in the root parsing rule.

6. The method of claim 3 wherein the act of protecting the personally identifiable information in selected fields of the message based on the child rules further comprises the act of applying a filtering rule specified in the child rules to include messages having fields containing personally identifiable information based on a value of a selected field.

7. The method of claim 3 wherein the act of protecting the personally identifiable information in selected fields of the message based on the child rules further comprises the act of applying a filtering rule specified in the child rules to exclude messages not having any fields containing personally identifiable information based on a value of a selected field.

8. The method of claim 3 wherein the act of protecting the personally identifiable information in selected fields of the message based on the child rules further comprises the act of applying a processing rule specified in the child rules to protect personally identifiable information in a selected field specified in the processing rule.

9. The method of claim 8 wherein the act of applying a processing rule specified in the child rules to protect personally identifiable information in a selected field specified in the processing rule further comprises:
    applying a parsing rule specified in the child rules to search the selected field for personally identifiable information of a type specified the parsing rule; and
    protecting the personally identifiable information of the specified type found in the selected field.

10. The method of claim 3 wherein the act of protecting the personally identifiable information in selected fields of the message based on the child rules further comprises the act of applying a parsing rule specified in the child rules to separate a selected field specified in the processing rule into sub-fields.

11. The method of claim 10 wherein the act of protecting the personally identifiable information in selected fields of the message based on the child rules further comprises the act of:
    separating the value of a field into name fields and value fields based on a delimiter pair specified in the child rules; and
    protecting the personally identifiable information in the value field if found in the selected field;

applying a parsing rule specified in the child rules to separate the selected field specified in the parsing rule into sub-fields.

12. The method of claim 1 wherein the act of scrubbing only the personally identifiable information in the message based on the rule set to produce a scrubbed message further comprising:
storing a replacement value for each unique instance of personally identifiable information in the message based on the rules from the scrubber configuration; and
re-using the replacement value for when duplicate instances of the personally identifiable information.

13. A system for scrubbing personally identifiable information from a message, the system comprising:
a processing unit; and
a memory including computer executable instructions which, when executed by a processing unit, cause the system to provide:
a scrubber configuration including a root parsing rule and a processing rule specifying how to locate and replace the personally identifiable information appearing in the message, the scrubber configuration corresponding to a log containing messages;
a scrubbing agent loading the scrubber configuration, the scrubber agent comprising a parsing engine executing the root parsing to separate the message into fields, wherein unstructured data fields are formatted and delimiters are added to the unstructured data field such that personally identifiable information is identifiable from unlabeled data, and a processing engine executing the processing rule to replace the personally identifiable information in a selected field with a replacement value preventing the personally identifiable information from being exposed but allowing specific personally identifiable information to be located by correlation, the personally identifiable information being associated with metadata that identifies a type of personally identifiable information, and applying a corresponding scrubbing rule to the type of personally identifiable information, the corresponding scrubbing rule generating replacement values for the personally identifiable information in the message based on the rule set by generating a replacement value for a first instance of specific personally identifiable information in the message based on the corresponding scrubbing rule and storing a reference to the replacement value associated with the specific personally identifiable information, and substituting replacement values for the personally identifiable information in the message to create the scrubbed message by retrieving the replacement value associated with the specific personally identifiable information using the reference when additional instances of the specific personally identifiable information are encountered, and using the retrieved replacement value for the additional instances of the specific personally identifiable information.

14. The system of claim 13 wherein the scrubbing agent further comprises a filtering engine executing a filtering rule specified in the scrubber configuration to determine whether to apply the root parsing rule to the message.

15. The system of claim 13 wherein the parsing engine executes a parsing rule specified in the scrubber configuration to separate the selected field into sub-components.

16. The system of claim 15 wherein the processing engine executes an additional processing rule specified in the scrubber configuration to replace personally identifiable information from a selected component with a correlatable replacement value.

17. A computer readable storage device containing computer executable instructions which, when executed by a computer, perform a method of removing personally identifiable information from a log, the method comprising:
loading a message containing both non-personal data and personally identifiable information;
loading a scrubber configuration providing rules for locating and protecting personally identifiable information in the message, the scrubber configuration associated with a corresponding log containing the message;
parsing the message into fields based on the rule set, wherein unstructured data fields are formatted and delimiters are added to the unstructured data field such that personally identifiable information is identifiable from unlabeled data;
applying the rules from the scrubber configuration to the message to locate the personally identifiable information, the personally identifiable information being associated with metadata that identifies a type of personally identifiable information, and applying a corresponding scrubbing rule to the type of personally identifiable information;
generating replacement values for the personally identifiable information in the message based on the rules from the scrubber configuration, comprising generating a replacement value for a first instance of specific personally identifiable information in the message based on the rules from the scrubber configuration and storing a reference to the replacement value associated with the specific personally identifiable information;
substituting replacement values for the personally identifiable information in the message to create a scrubbed message, comprising retrieving the replacement value associated with the specific personally identifiable information using the reference when additional instances of the specific personally identifiable information are encountered, and using the retrieved replacement value for the additional instances of the specific personally identifiable information; and
storing the scrubbed message in a data repository.

18. The computer readable storage device of claim 17 wherein the act of generating replacement values for the personally identifiable information in the message based on the rules from the scrubber configuration further comprises the act of generating a replacement value that can be correlated to the specific personally identifiable information represented by the replacement value allowing scrubbed messages containing the specific personally identifiable information to be located without exposing other personally identifiable information.

19. The computer readable storage device of claim 17:
wherein the act of generating replacement values for the personally identifiable information in the message based on the rules from the scrubber configuration further comprises:
generating a hash corresponding to the personally identifiable information;
generating cipher text encrypting the personally identifiable information;
generating a globally unique identifier linked to the hash and the cipher text; and
wherein the act of substituting replacement values for the personally identifiable information in the message to create a scrubbed message further comprises the act of substituting the globally unique identifier for the personally identifiable information for use as a reference to retrieve the corresponding hash or cipher text.

20. A method of scrubbing a data set having messages containing both non-personal data and personally identifiable information, the method comprising:
    loading a message containing both non-personal data and personally identifiable information;
    loading a scrubber configuration providing rules for locating and protecting personally identifiable information in the message, the scrubber configuration associated with a corresponding log containing the message;
    parsing the message into fields based on the rule set, wherein unstructured data fields are formatted and delimiters are added to the unstructured data field such that personally identifiable information is identifiable from unlabeled data;
    applying the rules from the scrubber configuration to the message to locate the personally identifiable information, the personally identifiable information being associated with metadata that identifies a type of personally identifiable information, and applying a corresponding scrubbing rule to the type of personally identifiable information;
    generating replacement values for the personally identifiable information in the message based on the rules from the scrubber configuration, comprising:
        generating a hash corresponding to the personally identifiable information;
        generating cipher text encrypting the personally identifiable information;
        generating a globally unique identifier linked to the hash and the cipher text; and
    substituting replacement values for the personally identifiable information in the message to create a scrubbed message, comprising substituting the globally unique identifier for the personally identifiable information for use as a reference to retrieve the corresponding hash or cipher text; and
    storing the scrubbed message in a data repository.

* * * * *